United States Patent
Pan et al.

(10) Patent No.: US 9,972,347 B1
(45) Date of Patent: May 15, 2018

(54) METHOD FOR HEAD STACK ASSEMBLY REWORK

(71) Applicant: Western Digital Technologies, Inc., Irvine, CA (US)

(72) Inventors: Tzong-Shii Pan, San Jose, CA (US); Cliff Zhang, San Jose, CA (US); Maribel Castro, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 336 days.

(21) Appl. No.: 14/628,111

(22) Filed: Feb. 20, 2015

Related U.S. Application Data

(60) Continuation-in-part of application No. 14/322,616, filed on Jul. 2, 2014, now Pat. No. 9,324,344, which is a continuation-in-part of application No. 14/209,909, filed on Mar. 13, 2014, now Pat. No. 9,165,580, application No. 14/628,111, which is a continuation-in-part of application No. 14/492,266, filed on Sep. 22, 2014, now Pat. No. 9,633,680, which (Continued)

(51) Int. Cl.
*G11B 5/48* (2006.01)
*G11B 5/29* (2006.01)
*G11B 5/84* (2006.01)

(52) U.S. Cl.
CPC ............ *G11B 5/4813* (2013.01); *G11B 5/295* (2013.01); *G11B 5/48* (2013.01); *G11B 5/486* (2013.01); *G11B 5/4833* (2013.01); *G11B 5/4846* (2013.01); *G11B 5/4853* (2013.01); *G11B 5/84* (2013.01); *Y10T 29/4903* (2015.01); *Y10T 29/49023* (2015.01); *Y10T 29/49025* (2015.01); *Y10T 29/49027* (2015.01)

(58) Field of Classification Search
CPC . G11B 35/48; G11B 35/4813; G11B 35/4833; G11B 35/4846; G11B 35/4853; G11B 35/486; G11B 35/84; G11B 5/295; Y10T 29/49023; Y10T 29/49025; Y10T 29/49027; Y10T 29/4903
See application file for complete search history.

(56) References Cited

U.S. PATENT DOCUMENTS

| | | | |
|---|---|---|---|
| 8,320,084 B1 * | 11/2012 | Shum | G11B 5/4846 360/245.9 |
| 2001/0054225 A1 * | 12/2001 | Mita | G11B 5/4853 29/603.02 |
| 2006/0085970 A1 * | 4/2006 | Hosaka | Y10T 29/49023 29/603.03 |

FOREIGN PATENT DOCUMENTS

JP          10011930 A  *  1/1998

* cited by examiner

*Primary Examiner* — A. Dexter Tugbang

(57) ABSTRACT

A method for head stack assembly (HSA) rework is disclosed. A first head gimbal assembly (HGA) includes a first suspension attached to an arm of the HSA, and a first flexure tail that terminates in a first bonding region that is bonded to a flexible printed circuit (FPC) of the HSA. The first HGA is removed by cutting the first bonding region from a remainder of the first flexure tail and detaching the first suspension from the arm. The first bonding region of the first flexure tail is left bonded to the FPC. A replacement HGA includes a replacement suspension and a replacement flexure tail that terminates in a second bonding region. The replacement HGA is installed on the HSA by attaching the replacement suspension to the arm, overlaying the second bonding region on the first bonding region, and bonding the second bonding region to the first bonding region.

20 Claims, 10 Drawing Sheets

Related U.S. Application Data is a continuation-in-part of application No. 13/897,609, filed on May 20, 2013, now Pat. No. 9,214,174, which is a division of application No. 12/916,237, filed on Oct. 29, 2010, now Pat. No. 8,467,153.

(60) Provisional application No. 61/914,315, filed on Dec. 10, 2013.

METHOD FOR HEAD STACK ASSEMBLY REWORK

CROSS-REFERENCES TO RELATED APPLICATIONS

This application claims priority under 35 U.S.C. § 120 as a continuation-in part of pending U.S. patent application Ser. No. 14/322,616 filed on 2014 Jul. 2, entitled "Disk drive head suspension tail with ground pad outside of bonding region," which is a continuation-in-part of (and thereby also claims priority to) pending U.S. patent application Ser. No. 14/209,909 filed on 2014 Mar. 13, entitled "Disk drive head suspension tail with stiffened edge alignment features," and thereby also claims priority to provisional U.S. Patent Application Ser. No. 61/914,315, entitled "Disk drive head suspension tail alignment feature," filed on 2013 Dec. 10.

This application also claims benefit under 35 U.S.C. § 120 as a continuation-in-part of pending U.S. patent application Ser. No. 14/492,266, filed 2014 Sep. 22, entitled "Head suspension having a flexure tail with a covered conductive layer and structural layer bond pads," which is a continuation-in-part of pending U.S. patent application Ser. No. 13/897,609, filed 2013 May 20, entitled "Disk drive head gimbal assembly having a flexure tail with folded bond pads," to which priority is also claimed through the chain of priority, and which is a divisional of U.S. patent application Ser. No. 12/916,237, filed 2010 Oct. 29, entitled "Disk drive head gimbal assembly having a flexure tail with folded bond pads," (issued as U.S. Pat. No. 8,467,153), and to which priority is also claimed through the chain of priority.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. A head that can read may be referred to as a "read head" herein, even if it includes other structures and functions such as a transducer for writing, a heater, a microactuator, an electronic lapping guide, a laser diode, etc.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator.

Modern laminated flexures typically include conductive copper traces that are isolated from a stainless steel structural layer by a polyimide dielectric layer. So that the signals from/to the head can reach the FPC on the actuator body, each HGA flexure includes a flexure tail that extends away from the head along a corresponding actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained against the conductive electrical terminals of the FPC while the aforementioned electrical connections are made by ultrasonic bonding, solder jet bonding, solder bump reflow, or anisotropic conductive film (ACF) bonding.

Modern magnetic read heads are trending to include more and more additional structures and functions that require electrical connection. For example, electrical connections to the read head may be required for the read transducer (e.g. a tunneling magnetoresistive sensor), a write transducer (e.g. an inductive writer), a heater for dynamic flying height control, a microactuator for fine tracking control, an electronic lapping guide to enhance control of a head fabrication step, and/or a laser diode to heat a local region of an adjacent disk for so-called heat assisted magnetic recording.

After assembly, functional tests of the HSA may reveal that one or more of the attached HGAs is defective and needs to be replaced. Such replacement is a type of "rework" of the assembled HSA and/or an assembled disk drive. Such rework may be time consuming and costly, for example partially due to a need to remove remaining bonding material after an HGA has been removed. Hence there is a need in the art for improved structures and methods that can make HSA rework more efficient, less time consuming, and therefore less costly.

DESCRIPTION OF THE PREFERRED EMBODIMENTS

Figure 1:
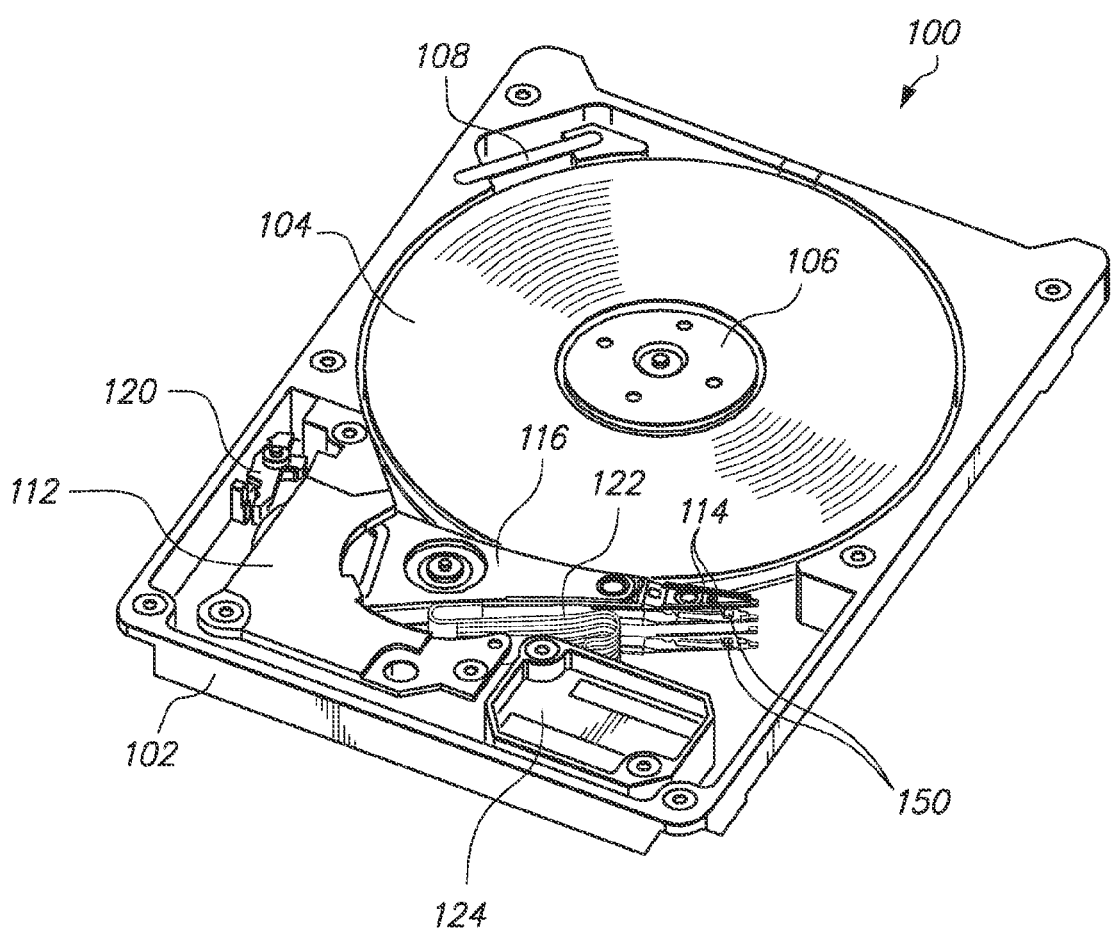
FIG. 1 is a top perspective view of a disk drive capable of rework by an embodiment of the present invention.

FIG. 1 is a top perspective view of a disk drive 100 capable of rework by an embodiment of the present invention. The disk drive 100 includes a disk drive base 102 and two annular magnetic disks 104. The disk drive 100 further includes a spindle 106, rotatably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 116 that is pivotably mounted on disk drive base 102. Voice coil motor 112 pivots the actuator 116 through a limited angular range so that at least one head gimbal assembly (HGA) 114 is desirably positioned relative to one or more tracks of information on a corresponding one of the disks 104. In the embodiment of FIG. 1, the actuator 116 includes three arms upon which four HGAs 114 are attached, each corresponding to a surface of one of the two disks 104. However in other embodiments fewer or more HGAs 114 may be included depending on the number of disks 104 that are included and whether the disk drive 100 is depopulated.

Each HGA 114 preferably includes a read head 150 for reading and writing from/to one of the disks 104. The head 150 may be referred to herein as a read head, even though it may also perform other functions and contain other structures such as a writer for writing data, a microactuator, a heater, a laser, a lapping guide, etc. The actuator 116 may occasionally be latched at an extreme angular position within the limited angular range, by latch 120. Electrical signals to/from the HGAs 114 are carried to other drive electronics via a flexible printed circuit (FPC) that includes a flex cable 122 (preferably including a preamplifier circuit) and flex cable bracket 124.

Figure 2:
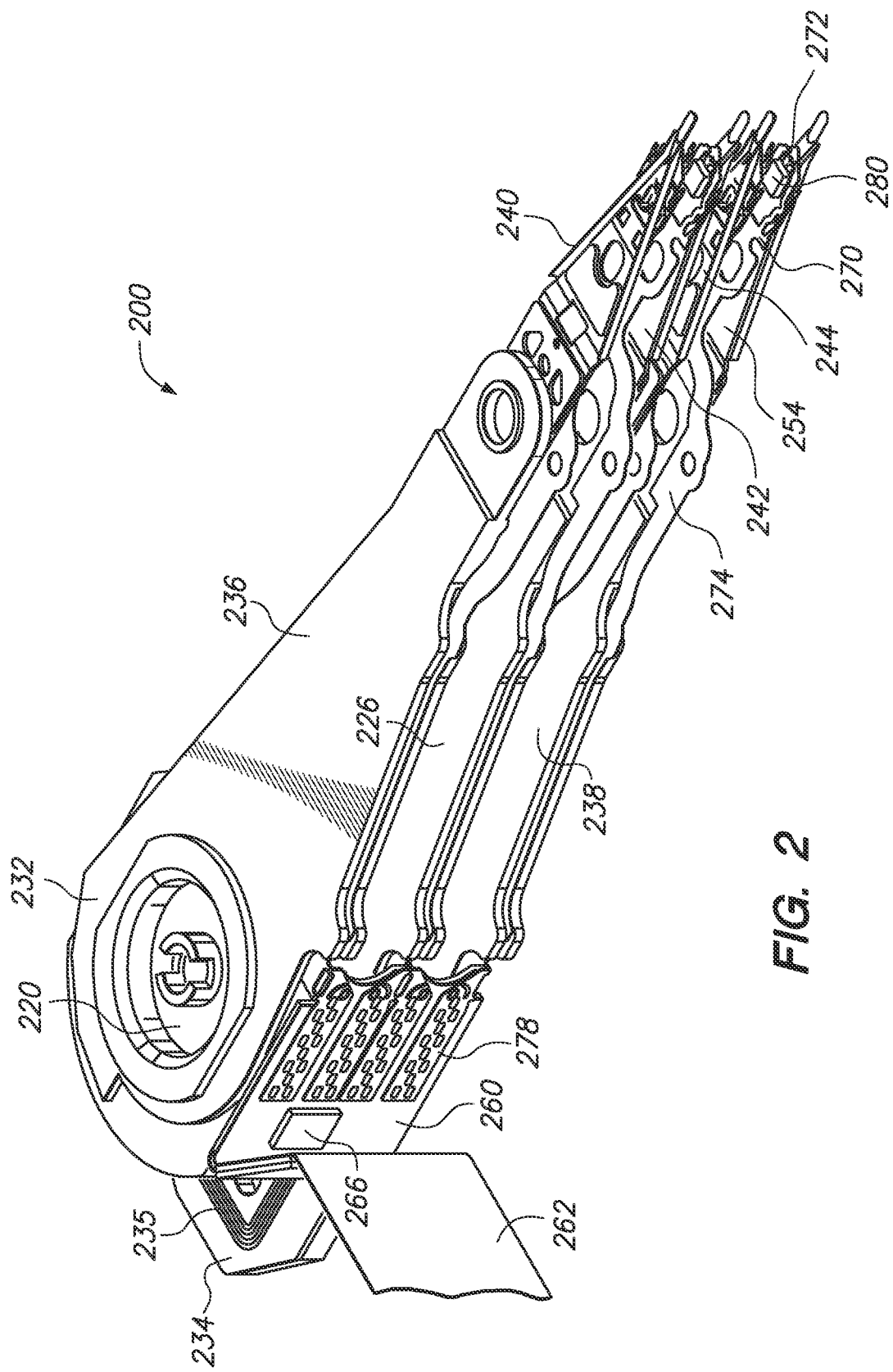
FIG. 2 is a perspective view of an assembled head stack assembly (HSA), capable of rework by an embodiment of the present invention.

FIG. 2 is a perspective view of an assembled head stack assembly (HSA) 200, capable of rework by an embodiment of the present invention. The HSA 200 includes an actuator body 232 and a plurality of actuator arms 226, 236, 238 extending from the actuator body 232. The actuator body 232 includes a pivot bearing cartridge 220 disposed in the actuator bore, and a coil support 234 that supports a coil 235 and extends from the actuator body 232 in a direction that is generally opposite the actuator arms 226, 236, 238. The HSA 200 also includes a plurality of head gimbal assemblies (HGA) 240, 242, 244, 254, attached to the actuator arms 226, 236, 238. For example, such attachment may be made by swaging. Note that the inner actuator arm 226 includes two HGAs 242, 244, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

Each HGA includes a read head for reading and/or writing to an adjacent disk surface (e.g. HGA 254 includes read head 280). The read head 280 is attached to a tongue portion 272 of a laminated flexure 270. The laminated flexure 270 is part of the HGA 254, and is attached to a load beam (the part of the HGA 254 to which the numerical label 254 points). The laminated flexure 270 may include a structural layer (e.g. stainless steel), a dielectric layer (e.g. polyimide), and a conductive layer into which traces are patterned (e.g. copper). The HSA 200 also includes a FPC 260 adjacent the actuator body 232. The FPC 260 includes a flex cable 262 and a preamplifier 266. The FPC 260 may comprise a laminate that includes two or more conventional dielectric and conductive layer materials (e.g. one or more polymeric materials, copper, etc.). The laminated flexure 270 includes a flexure tail 274 that runs along the actuator arm 238 to a terminal region 278 of the laminated flexure 270 that is electrically connected to bond pads of the FPC 260.

Methods of electrical connection of the flexure tails (e.g. flexure tail 274) to the FPC 260 include ultrasonic bonding of gold coatings thereon, solder reflow, solder ball jet (SBJ), and anisotropic conductive film (ACF) bonding, and are preferably but not necessarily automated. To electrically connect and securely attach the flexure tails to the FPC 260, the flexure tails are first aligned with the FPC 260, and then pressed against the FPC 260 (at least temporarily) while electrical connection is established and secure attachment is completed. Maintaining alignment and sufficient uniform pressure and temperature to groups of bond pads may be desirable during this process.

Figure 3:
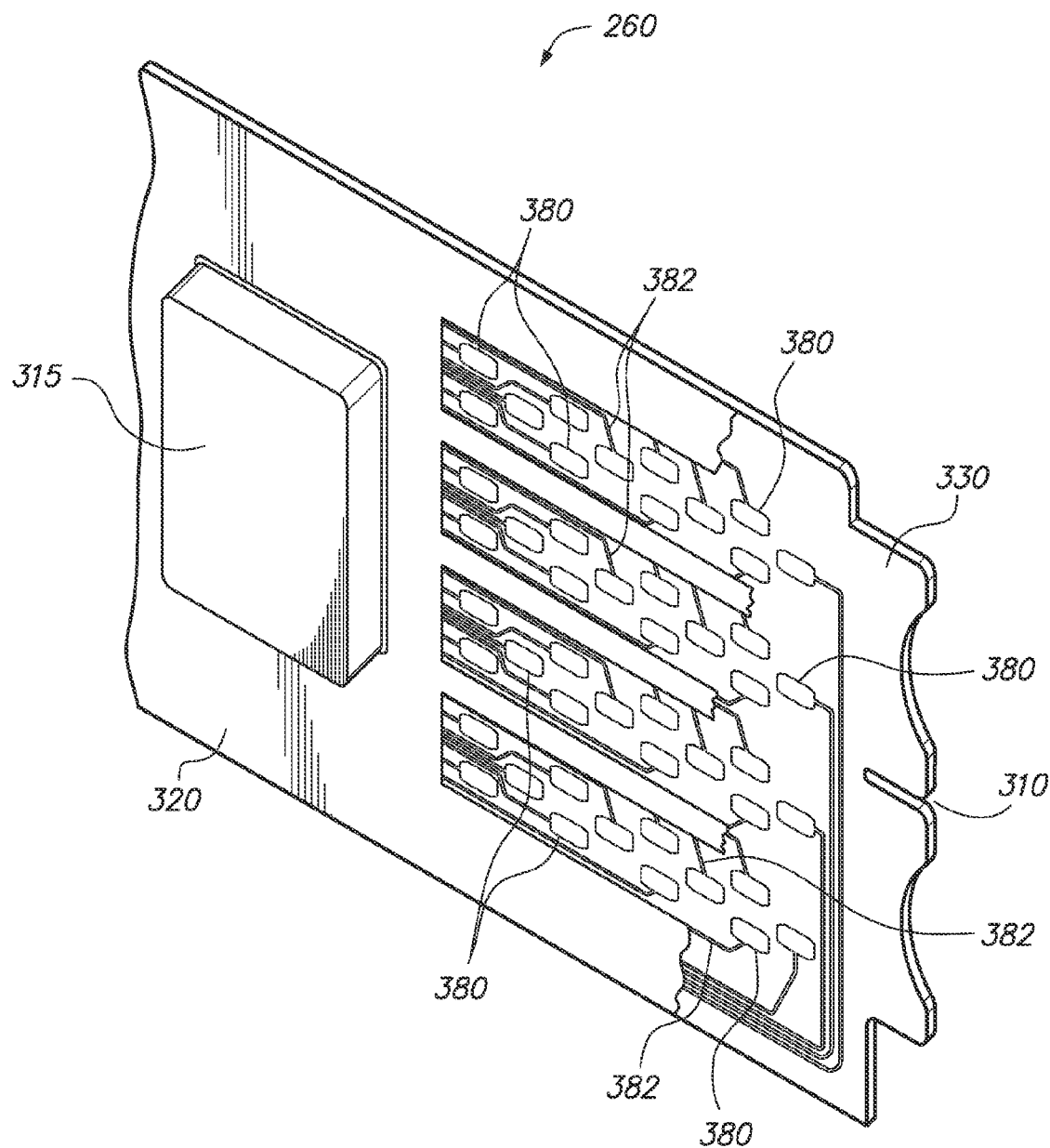
FIG. 3 is a perspective view of a portion of a flexible printed circuit (FPC) capable of rework by an embodiment of the present invention.

FIG. 3 depicts the FPC 260 before flexure tail terminal regions (i.e. the portion of each flexure tail that overlaps the FPC 260, for example, the flexure tail terminal region 278 of FIG. 2) are bonded thereto. The FPC 260 includes electrical conduits 382 that terminate at FPC bond pads 380, which are aligned with and connected to flexure bond pads of the terminal regions (e.g. flexure tail terminal region 278) of the HGA flexure tails. The FPC electrical conduits 382 may comprise copper and may connect to a pre-amplifier chip 315. Two of the HGA flexure tails may pass through the FPC slit 310 to help facilitate their support and alignment.

The FPC 260 may include an optional insulative cover layer 320 having windows exposing the regions where the flexure tail terminal regions and the pre-amplifier chip 315 are bonded thereto. The cover layer 320 is shown cut away in the view of FIG. 3, so that the electrical conduits 382 can be better depicted. The FPC 260 may also include an insulative substrate 330 upon which the FPC electrical conduits 382 are deposited.

Figure 4A:
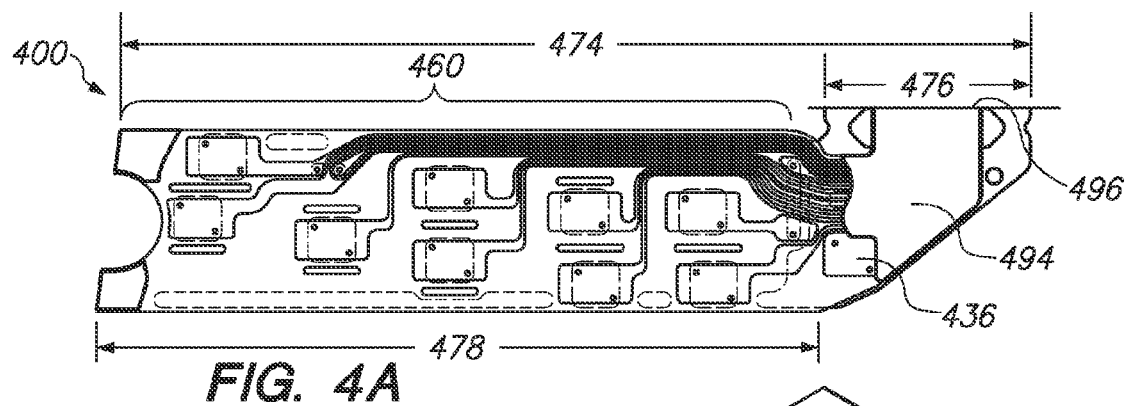
FIG. 4A depicts a flexure tail terminal region capable of rework by an embodiment of the present invention.
Figure 4B:
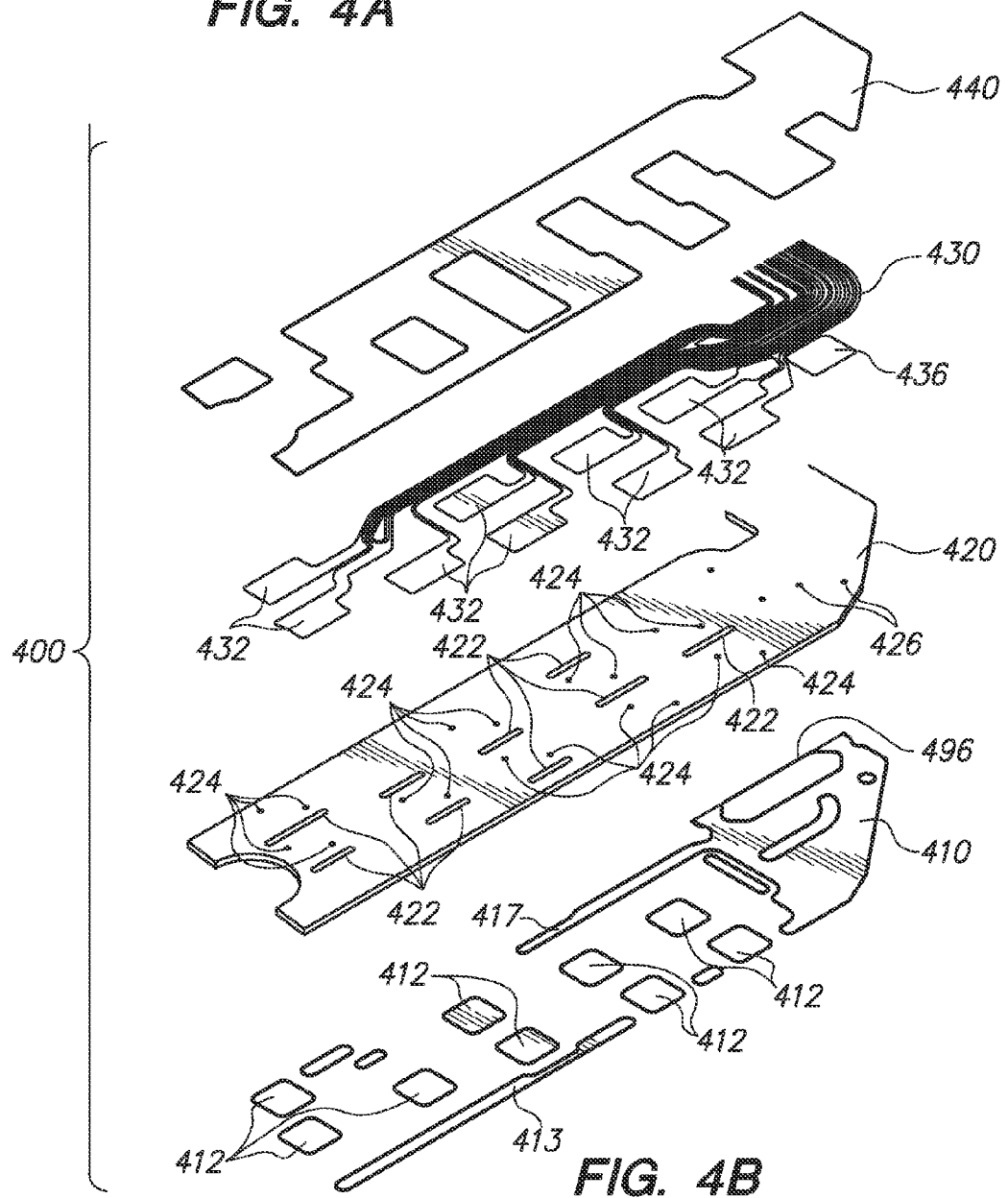
FIG. 4B is an exploded view of the flexure tail of FIG. 4A.

FIG. 4A is an assembled plan view of a flexure tail terminal region 400, capable of rework according to an embodiment of the present invention. FIG. 4B is an exploded perspective view of the flexure tail terminal region 400. Now referring to FIGS. 4A and 4B, the flexure tail terminal region 400 includes a structural layer 410 (e.g. stainless steel), a conductive layer 430 (e.g. copper), and a dielectric layer 420 (e.g. polyimide) between the structural layer 410 and the conductive layer 430. The flexure tail terminal region 400 may also include an optional cover layer 440 that comprises an electrically insulative material (e.g. an insulative polymer).

Now referring to FIGS. 3, 4A and 4B, the flexure tail terminal region 400 is preferably configured to at least partially overlap the FPC 260. The flexure tail terminal region 400 preferably includes a plurality of flexure bond pads 432 that are electrically conductive and that may be defined in the conductive layer 430 and/or structural layer 410, and that are aligned with corresponding ones of the plurality of FPC bond pads 380. Some or all of the plurality of flexure bond pads 432 are in electrical communication with a head (e.g. head 280 of FIG. 2).

The flexure tail terminal region 400 may also include other layers, such as an additional conductive layer and an additional dielectric layer (e.g. in the case of a dual conductive layer flexure), but the layers described herein would still be included as described. In certain embodiments, the thickness of the structural layer 410 may be preferably less than 20 microns, the thickness of the dielectric layer 420 may be preferably less than 15 microns, the thickness of the conductive layer 430 may be preferably less than 15 microns, and a total thickness of the flexure tail terminal region 400 at each of the plurality of flexure bond pads 432 may be preferably at least 25 microns.

In certain embodiments, a conventional anisotropic conductive film is disposed between the FPC 260 and the flexure tail terminal region 400, and the flexure tail terminal region 400 overlaps the anisotropic conductive film in a bonding region 460 (the portion of the flexure tail terminal region 400 having the bonding region longitudinal span 478). In such embodiments, each of the plurality of flexure bond pads 432 is bonded to the corresponding one of the plurality of FPC bond pads 380 by the anisotropic conductive film in the bonding region 460.

Still referring to FIGS. 3, 4A, and 4B, during the HSA process an anisotropic conductive film may be disposed between the FPC 260 and the flexure tail terminal region 400. Optionally, this may be done by overlaying a rectangular strip of the anisotropic conductive film on the FPC 260. Next, a thermode tool may be pressed against a thermode tool application area of the flexure tail terminal region 400 (which in the embodiment of FIG. 4A is preferably but not necessarily coincident with the bonding region 460), to press the flexure bond pads 432 against the FPC bond pads 380 for a period. Since all of the plurality of flexure bond pads 432 are preferably disposed within the thermode tool application area of the flexure tail terminal region 400, the thermode tool simultaneously applies heat and increased pressure to all of the plurality of flexure bond pads 432, to preferably simultaneously bond them to corresponding ones of the plurality of FPC bond pads 380 by the anisotropic conductive film (ACF).

In certain embodiments, the anisotropic conductive film may comprise an adhesive material that includes a plurality of electrically conductive beads. In such embodiments, the electrically conductive beads may be of substantially similar size, and the plurality of electrically conductive beads may be arranged in a monolayer with each of the plurality of electrically conductive beads in electrical contact with one of the plurality of flexure bond pads 432 and the corresponding one of the plurality of FPC bond pads 380. The dielectric layer 420 may optionally include a plurality of through openings 422, for example to control the spread of ACF material used to make electrical connections to the flexure bond pads 432.

In the embodiment of FIGS. 4A and 4B, the structural layer 410 includes a plurality of discontinuous bond pad backing islands 412. Each of the plurality of discontinuous bond pad backing islands 412 is disposed in alignment with a corresponding one of the plurality of flexure bond pads 432, and may be considered as part of that flexure bond pad 432. Each of the plurality of flexure bond pads 432 includes a conductive island (e.g. copper) facing the FPC and a corresponding one of the plurality of discontinuous bond pad backing islands 412 (e.g. stainless steel) facing away from the FPC, with the flexure bond pad 432 being electrically connected to the corresponding discontinuous bond pad backing island 412 island optionally by a via 424 through the dielectric layer 420. Such electrical connections may enable functional utility of the HSA, after rework by certain embodiments of the novel rework method disclosed herein.

In the embodiment of FIGS. 4A and 4B, the flexure tail terminal region 400 also optionally includes a discontinuous edge stiffener island 413 in the structural layer 410 that does not overlap any of the flexure bond pads 432. In the embodiment of FIGS. 4A and 4B, the flexure tail terminal region 400 further comprises a narrow peninsula 417 in the structural layer 410 that is contiguous with the structural layer 410 in the flexure tail as it runs outside of the flexure tail terminal region (e.g. contiguous with the structural layer that runs along the actuator arm 238 in flexure tail 274 of FIG. 2).

Now referring to FIGS. 3, 4A and 4B, in certain embodiments the FPC 260 preferably may be designed so that the FPC conductive traces 382 are not disposed in locations that would overlap with the discontinuous edge stiffener island 413 or the narrow peninsula 417. Otherwise, such locations may be subject to undesirably high pressure from a thermode tool during the process of bonding the flexure tail terminal region 400 to the FPC 260, which may undesirably reduce the pressure or uniformity of pressure applied to the flexure bond pads by the thermode tool during head stack assembly.

In the embodiment of FIGS. 4A and 4B, the total longitudinal span 474 of the flexure tail terminal region 400 may optionally be in the range of 3 mm to 8 mm, and may include a bonding region longitudinal span 478 in the range of 2 mm to 7 mm. In certain embodiments, an adjacent area 494 of the flexure tail terminal region 400, outside the bonding region 460, may have an adjacent area longitudinal span 476 in the range of 1 mm to 3 mm.

Referring to FIGS. 3, 4A, and 4B, the conductive layer 430 may further comprise an exposed conductive ground pad 436 that is disposed outside of the bonding region 460. In the embodiment of FIGS. 4A and 4B, the exposed conductive ground pad 436 is disposed within the adjacent area 494. In the embodiment of FIGS. 4A and 4B, the adjacent area 494 of the flexure tail terminal region 400 may include a bent portion 496 extending approximately normally from a major plane of the flexure tail terminal region 400.

In the embodiment of FIGS. 3, 4A, and 4B, since the exposed conductive ground pad 436 is disposed outside of the bonding region 460, pressing the thermode tool against the thermode tool application area of the flexure tail terminal region 400 does not bond the exposed conductive ground pad 436 to any of the plurality of FPC bond pads 380. Instead, the conductive ground pad 436 may be exposed and hence accessible to be contacted by a test probe, for example to make a temporary electrical connection for testing. The exposed conductive ground pad 436 of the conductive layer 430 may be electrically connected to the structural layer 410 of the flexure thru vias 426 through the dielectric layer 420.

Figure 5A:
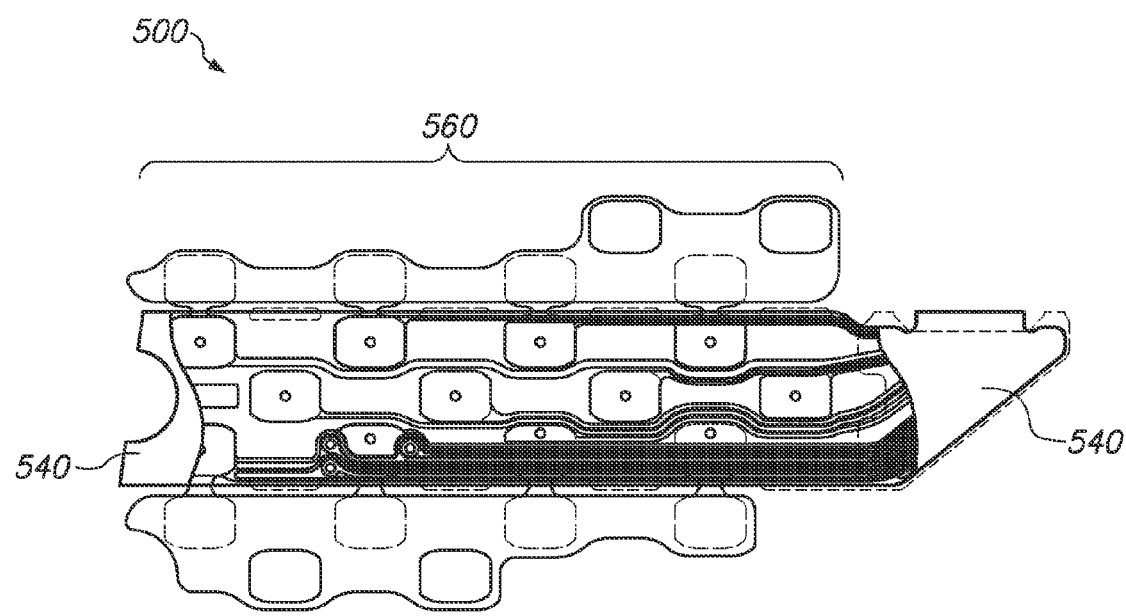
FIG. 5A depicts an alternative flexure tail terminal region before folding, capable of rework by an embodiment of the present invention.
Figure 5B:
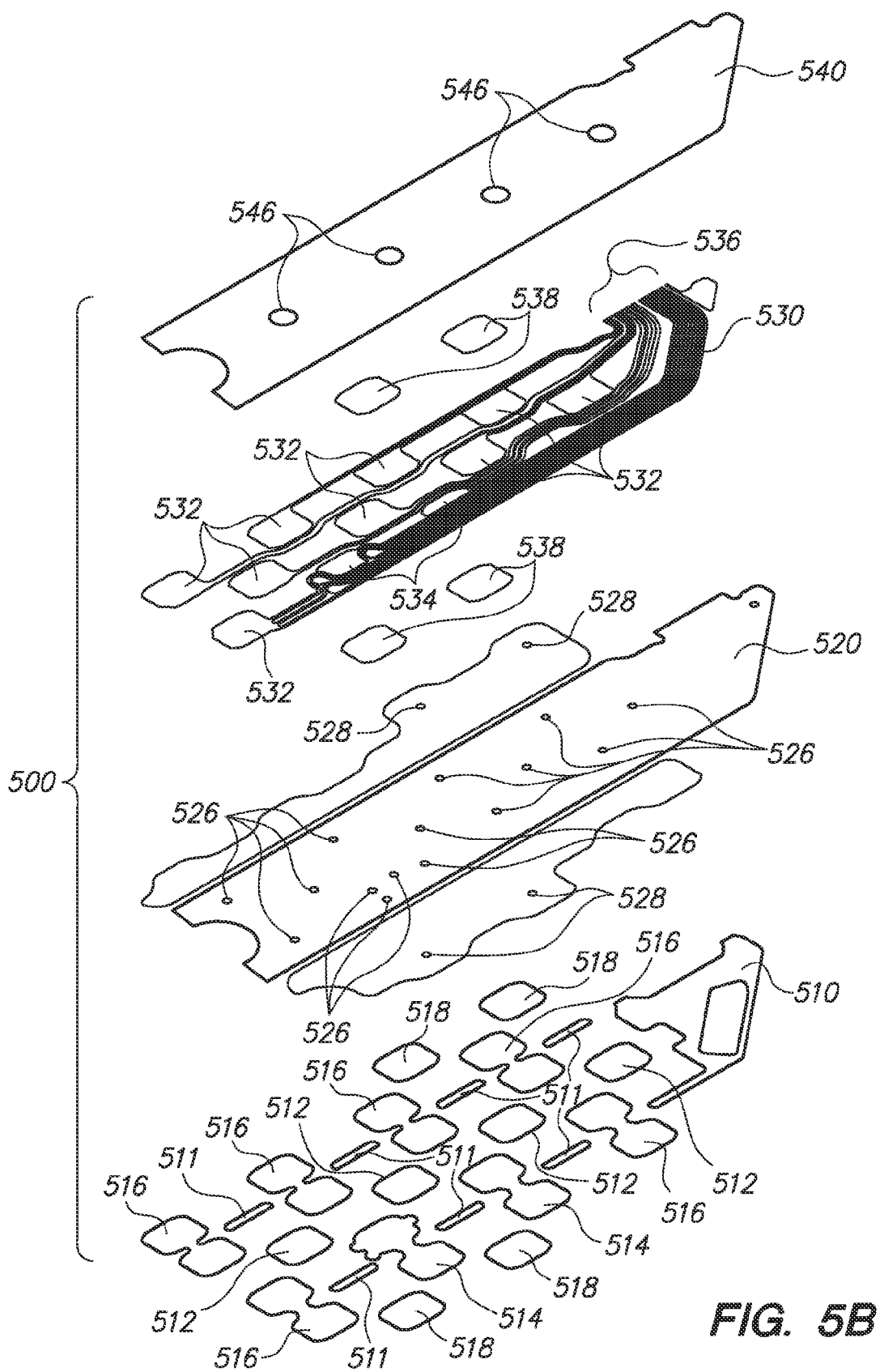
FIG. 5B is an exploded view of the flexure tail of FIG. 5A.
Figure 5C:
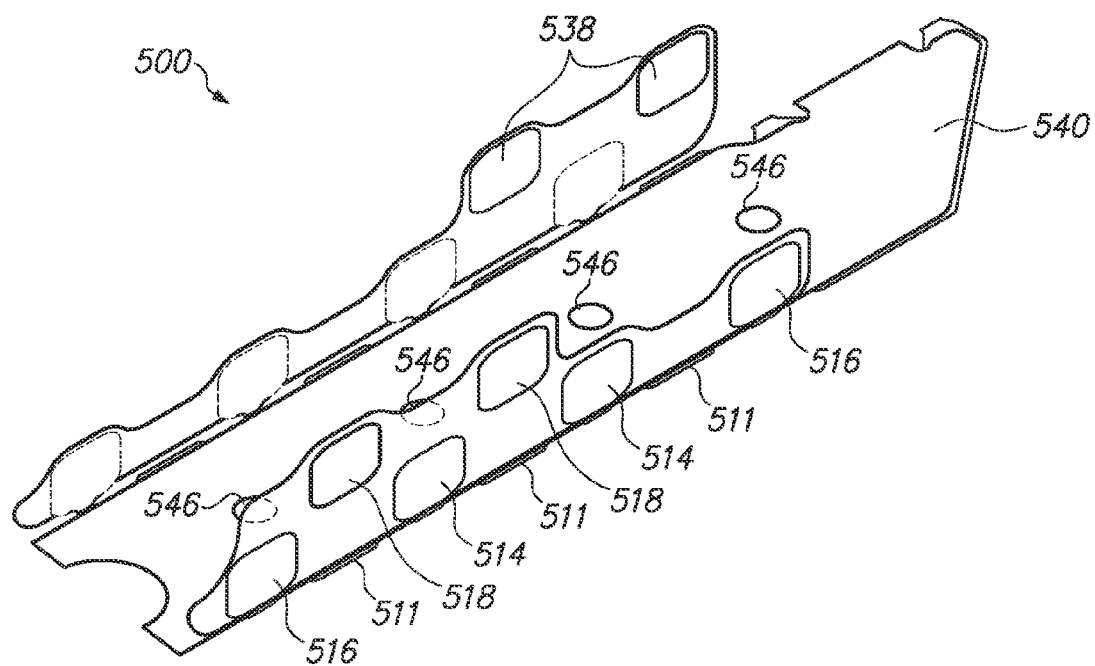
FIG. 5C depicts the flexure tail terminal region of FIG. 5A, partially folded.
Figure 5D:
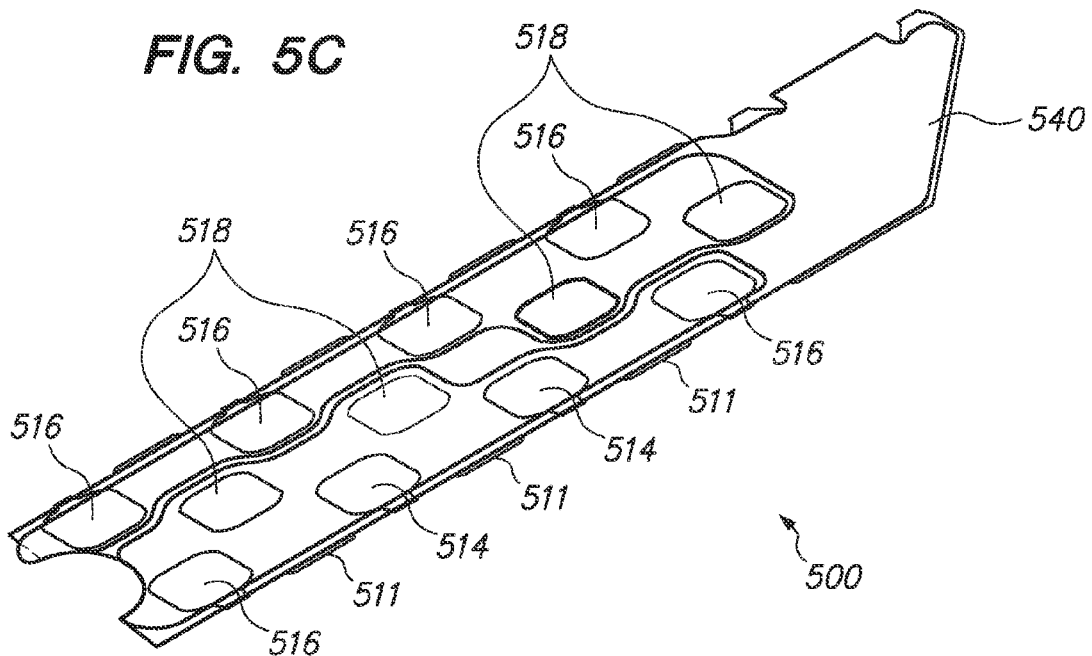
FIG. 5D depicts the flexure tail terminal region of FIG. 5A, after folding.

FIG. 5A depicts a terminal region of a flexure tail 500 before folding, capable of rework according to an embodiment of the present invention. FIG. 5B is an exploded view of the flexure tail 500. FIG. 5C depicts the flexure tail terminal region 500, partially folded. This view is to clarify the direction of folding; the flexure tail 500 does not necessarily attain such exact configuration during the manufacturing process. FIG. 5D depicts the flexure tail 500 after folding.

Now referring to FIGS. 5A-5D, the laminated flexure 500 includes a metallic conductive layer 530 (e.g. copper) that includes a plurality of electrically conductive traces 536 that are elongated and narrow and electrically connected to the read head (e.g. read head 280 of FIG. 2). The laminated flexure 500 also includes a metallic structural layer 510 (e.g. stainless steel) that is stiffer than the conductive layer 530. A first dielectric layer 520 (e.g. polyimide) is disposed between the structural layer 510 and the conductive layer 530. A second dielectric layer 540 (e.g. polyimide) substantially covers the conductive layer 530 in a flexure tail bonding region 560 (the region that overlaps the FPC). Note that the second dielectric layer 540 is shown partially cut away in the view of FIG. 5A, so that underlying features can be visible.

In the embodiment of FIGS. 5A-5D, the structural layer 510 includes a plurality of flexure bond pads 512, 514, 516, 518 in the flexure tail bonding region 560. Each of the plurality of flexure bond pads 514, 516, 518 in the structural layer 510 are configured to be aligned with, face, and be bonded to a corresponding one of a plurality of FPC bond pads (e.g. like FPC bond pads 380 of FIG. 3). Note that in the embodiment of FIGS. 5A-5D, the flexure tail should be routed conventionally so that the structural layer 510 (before folding) would face away from the FPC, except that after folding some or all of bond pads 514, 516, 518 in the structural layer are facing and being bonded to the FPC bond pads (in contravention of the conventional practice of bonding to exposed bond pads of the flexure's conductive layer not structural layer).

In the embodiment of FIGS. 5A-5D, each of the plurality of flexure bond pads 512, 514, 516 in the structural layer 510 is electrically connected to a corresponding one of the plurality of electrically conductive traces 536 in the conductive layer 530 by one of a first plurality of vias 526 through the first dielectric layer 520. Each of the first plurality of vias 526 through the first dielectric layer 520 may optionally comprise a hole through the first dielectric layer 520 that is filled with an electrically conductive material contacting a widened via connection land 532 or 534 in the conductive layer 530. Note that the vias 526 are too small to be practically depicted with dashed lines in FIG. 5A, though they are underlying features obscured by the conductive layer in FIG. 5A. The electrical connections made by vias 526 may enable functional utility of the HSA, after rework by certain embodiments of the novel rework method disclosed herein.

Advantageously, in the embodiment of FIGS. 5A-5D the via connection lands 532, 534 need not be as large as the bond pads 512, 514, 516 in the structural layer 510, because the via connection lands 532, 534 need not match the footprint of the FPC bond pads or be large enough to accommodate the solder or adhesive for bonding thereto. Therefore, more space can be made available for the traces 536 in the conductive layer 530 than in conventional flexure tail designs. For example, the smaller size of the via connection lands 534 (relative to the corresponding bond pads 514) allows more space for the traces 536 in the conductive layer 530.

In the embodiment of FIGS. 5A-5D, the flexure tail 500 is folded upon itself in the flexure tail bonding region 560, so that the conductive layer 530 becomes an inner layer (i.e. disposed between flexure bond pads 512, 514 of the structural layer 510, and the flexure bond pads 514, 516, 518 of the structural layer 510). In the embodiment of FIGS. 5A-5D, the structural layer 510 may optionally include a plurality of edge stiffening islands 511 that may reinforce the edges of the flexure tail 500 in the bonding region 560, after folding. After folding in the embodiment of FIGS. 5A-5D, the structural layer 510 is disposed externally on both sides of the conductive layer 530 in the flexure tail bonding region 560, with the flexure bond pads 512, 514, 516, 518 of the structural layer 510 being outward facing.

In the embodiment of FIGS. 5A-5D, the second dielectric layer 540 includes a second plurality of vias 546, each comprising a hole through the second dielectric layer 540 that is filled with electrically conductive solder. The embodiment of FIGS. 5A-5D also includes a third plurality of vias 528 through the first dielectric layer 520, which underlie the bond pads 518 in the structural layer 510. The second plurality of vias 546, in conjunction with the third plurality of vias 528, allow the bond pads 518 to be electrically connected (through both the first and second dielectric layers 520, 540) to the middle row of the connection lands 532 in the conductive layer 530, after folding. Optional conductive backing regions 538 may help make such electrical connections by effectively filling the third plurality of vias 528 with conductive metal (e.g. copper). The electrical connections made by vias 528 and 546 may enable functional utility of the HSA, after rework by certain embodiments of the novel rework method disclosed herein.

Now referring to the embodiment of FIG. 5D after folding, ACF bonding to the FPC may be accomplished by bringing a thermode tool into contact with the structural layer 510 on the second outward face of the flexure tail 500, to press the plurality of flexure bond pads 514, 516, 518 of the structural layer 510 on the first outward face against the plurality of FPC bond pads (e.g. FPC bond pads 380 of FIG. 3) for a period. The flexure bond pads 514, 516, 518 in the structural layer 510 (e.g. stainless steel) may optionally include a gold coating, for example to help facilitate or increase the electrical conductivity of such bonding to FPC bond pads.

Figure 6A:
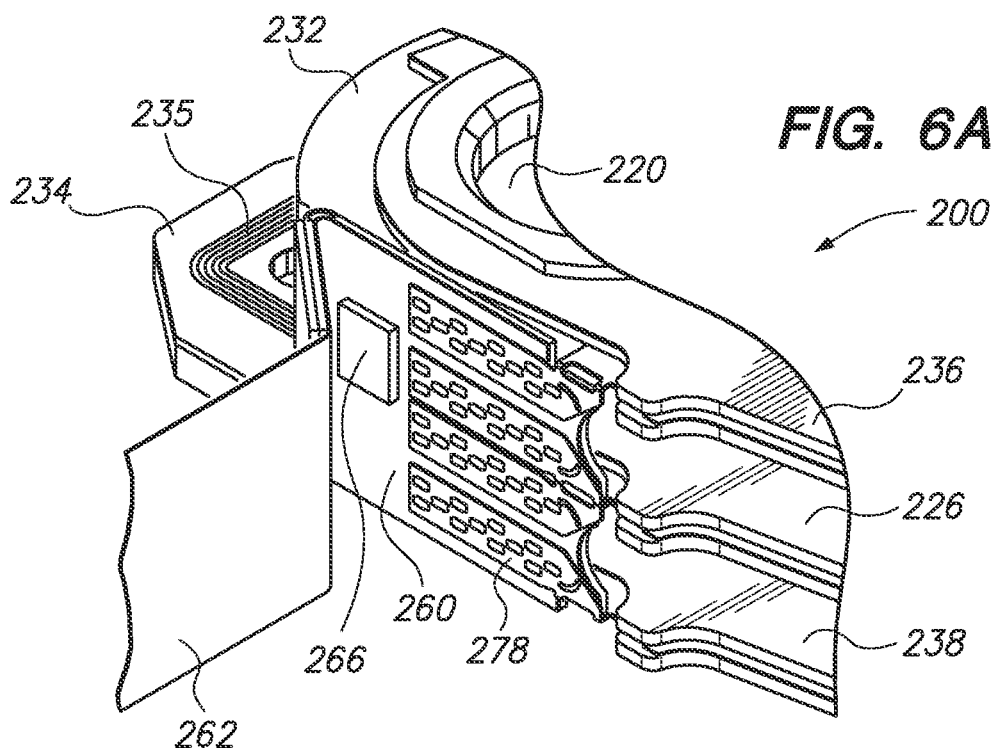
FIG. 6A depicts a portion of the assembled HSA of FIG. 2, before rework.

FIG. 6A depicts a portion of the assembled HSA 200 of FIG. 2, before rework. The HSA 200 includes an actuator body 232 from which a plurality of arms 236, 226, 238 extend. The HSA 200 also includes a FPC 260 having a plurality of FPC bond pads (e.g. FPC bond pads 380 of FIG. 3). For brevity, further description is not necessarily repeated here for HSA features shown in FIGS. 6A-D that have common numerical labels as those shown in FIG. 2, with the earlier description provided with reference to FIG. 2 being relied upon also.

Now referring to FIGS. 2, 3, and 6A, the HGA 254 includes a suspension (including the load beam structure to which the numerical label 254 points in FIG. 2) attached to the arm 238, a read head 280, and a flexure tail 274. In the present context, the term "suspension" may include the load beam, a swage mount, and a bend region, but (as used herein) it does not include the flexure. The suspension and the flexure together may be referred to as a "suspension assembly." Note that a HGA is considered to include both a suspension assembly and a head.

The flexure tail 274 is shown to include a flexure tail terminal region 278 that is bonded to the FPC 260 in a bonding region where it overlaps the FPC 260. The flexure tail terminal region includes a plurality of flexure tail conductive bond pads in the bonding region that face and are bonded to corresponding ones of the FPC bond pads 380, as described earlier with reference to FIGS. 4A-B and 5A-D.

Figure 6B:
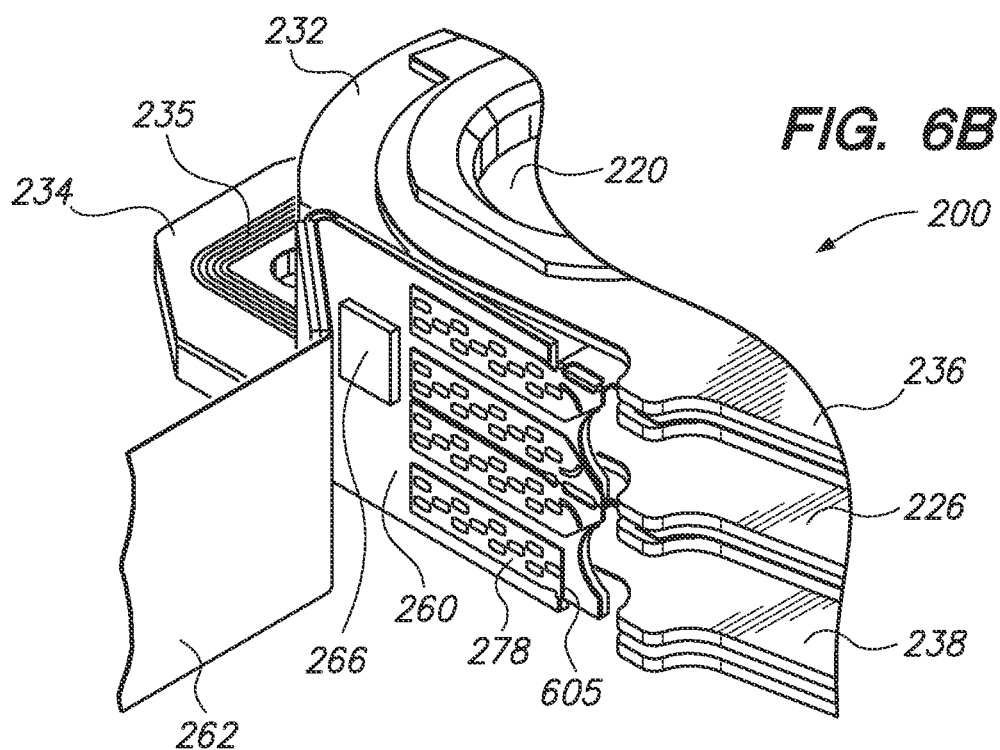
FIG. 6B depicts the portion of the HSA of FIG. 6A, at an intermediate stage of rework according to an embodiment of the present invention.

In certain embodiments, the disk drive, HSA 200, and/or HGA 254 may undergo functional testing after assembly. If the HGA 254 fails such a functional test, it may be desired to "rework" the HSA 200 to remove and replace the HGA 254. FIG. 6B depicts the portion of the HSA 200, at an intermediate stage of rework according to an embodiment of the present invention.

Specifically, in FIG. 6B the HGA 254 has been mostly removed from the HSA 200 by cutting the flexure tail terminal region 278. For example, and now referring to FIGS. 2 and 6B, the bonding region of the flexure tail terminal region 278 may be cut from the flexure tail 274 along a cut-line 605. The suspension of HGA 254 may be detached from the arm 238 (e.g. by de-swaging), and the HGA 254 removed, while leaving bonding region of the flexure tail terminal region 278 bonded to the FPC 260.

Figure 6C:
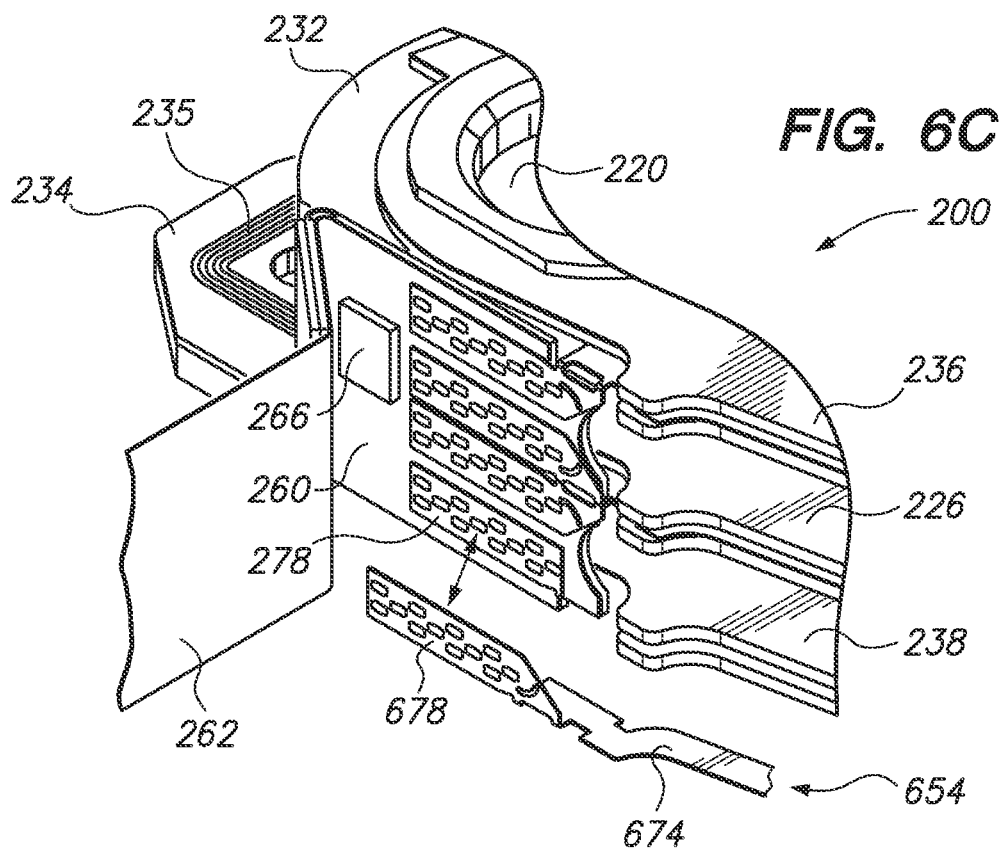
FIG. 6C depicts the portion of the HSA of FIG. 6A, at a later intermediate stage of rework according to an embodiment of the present invention.

FIG. 6C depicts the portion of the HSA 200, at a later intermediate stage of rework according to an embodiment of the present invention. FIG. 6C includes a cut-away exploded view of a replacement HGA 654 being positioned and installed on the HSA 200. The replacement HGA 654 includes a replacement suspension (not shown in FIG. 6C but identical in appearance to that of HGA 254 shown in FIG. 2) and a replacement flexure tail 674 that terminates in a bonding region of a replacement flexure tail terminal region 678. Installing the replacement HGA 654 may include attaching its suspension to the arm 238, as the removed HGA 254 had been attached previously (e.g. conventional swaging).

Figure 6D:
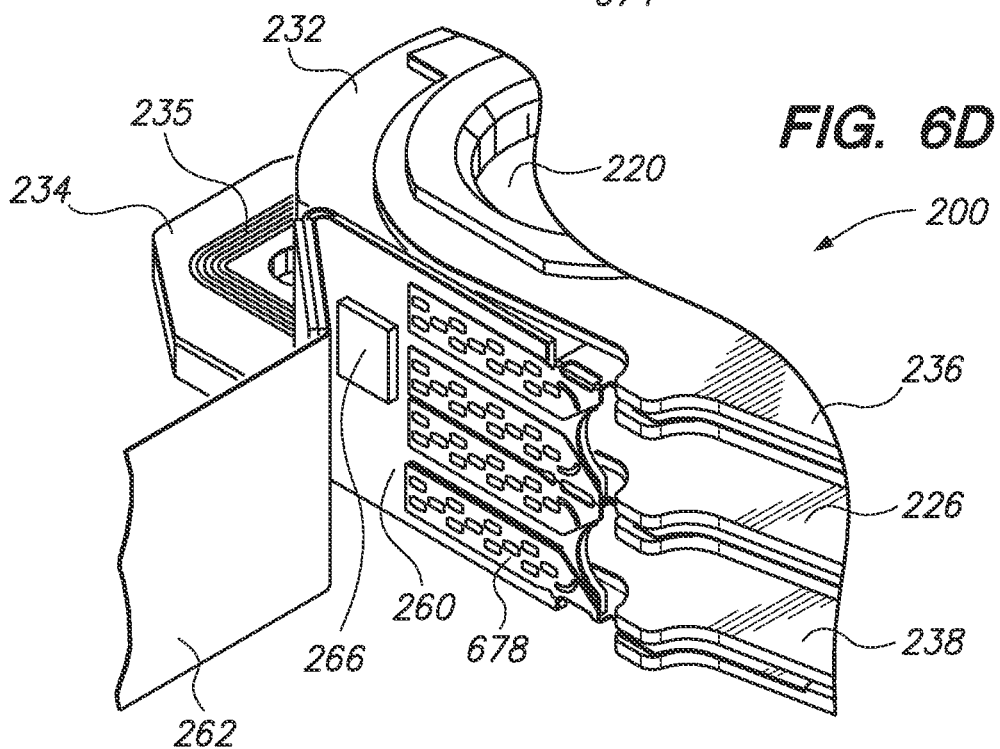
FIG. 6D depicts the portion of the assembled HSA of FIG. 6A, after rework according to an embodiment of the present invention.

Installing the replacement HGA 654 may also include aligning and overlaying the bonding region of the replacement flexure tail terminal region 678 on top of the remaining bonding region of the original flexure tail terminal region 278. Each of the flexure tail bond pads of the bonding region of the replacement flexure tail terminal region 678 is then bonded to a corresponding one of the flexure tail bond pads of the remaining bonding region of the original flexure tail terminal region 278. FIG. 6D depicts the assembled HSA 200, after such rework.

Bonding the bonding region of the replacement flexure tail terminal region 678, as described above, preferably establishes a plurality of electrical connections from the flexure tail bond pads of the bonding region of the replacement flexure tail terminal region 678 to the FPC, through the remaining bonding region of the original flexure tail terminal region 278. For example, if the flexure tail terminal region 678 has a construction similar to the optional example of FIGS. 4A-B, then bonding the bonding region of the replacement flexure tail terminal region 678 may comprise bonding patterned features of a copper layer of the bonding region of the flexure tail terminal region 678 to patterned features of a stainless steel layer of the remaining bonding region of the original flexure tail terminal region 278.

However, if the flexure tail terminal region 678 has a construction similar to the optional example of FIGS. 5A-D, then bonding the bonding region of the replacement flexure tail terminal region 678 may comprise bonding patterned features of a stainless layer of the bonding region of the flexure tail terminal region 678 to patterned features of a stainless steel layer of the remaining bonding region of the original flexure tail terminal region 278.

Alternatively, if the replacement flexure tail terminal region has a structural construction similar to the prior art flexure tail terminal region 778 shown in FIG. 7A (described in more detail subsequently), then bonding the replacement flexure tail terminal region may also be done according to an alternative embodiment of the present invention. In that case, bonding the replacement flexure tail terminal region may comprise bonding patterned copper features of the bonding region of a replacement flexure tail terminal region (structurally similar to that of the prior art flexure tail terminal region 778 shown in FIG. 7A), to patterned copper features of the remaining bonding region of an original and remaining cut-away flexure tail terminal region (also structurally similar to the prior art flexure tail terminal region 778 shown in FIG. 7A). In such a case, the patterned copper features of the flexure tail bonding regions may be structurally similar to the flexure flying-lead bond pads 732 shown FIG. 7A. However, the prior art method depicted in FIG. 7B is very different and disadvantageous, as described later with reference to that figure.

In the embodiment of FIGS. 6C and 6D, all of the flexure tail bond pads of the bonding region of the replacement flexure tail terminal region 678 optionally may be simultaneously bonded to the corresponding ones of the flexure tail bond pads of the remaining bonding region of the original flexure tail terminal region 278. This may be accomplished, for example, by pressure applied simultaneously to all bond pads by a flat face of a thermode tool that presses against the side of the replacement flexure tail terminal region 678 that faces away from the remaining original flexure tail terminal region 278.

Prior to bonding, an adhesive material that includes a plurality of electrically conductive beads optionally may be introduced between the replacement flexure tail terminal region 678 and the original flexure tail terminal region 278. The thermode tool may then be brought into contact with the replacement flexure tail terminal region 678, with the thermode tool pressing the flexure tail bond pads of the bonding region of the replacement flexure tail terminal region 678 against the corresponding ones of the flexure tail bond pads of the remaining bonding region of the original flexure tail terminal region 278 for a period. Such pressure is thereby indirectly applied to the bonding material (e.g. anisotropic conductive film) between the replacement flexure tail terminal region 678 and the original flexure tail terminal region 278. The thermode tool may also optionally transfer heat through the replacement flexure tail terminal region 678, raising the temperature of the bonding material during the period.

Figure 7A:
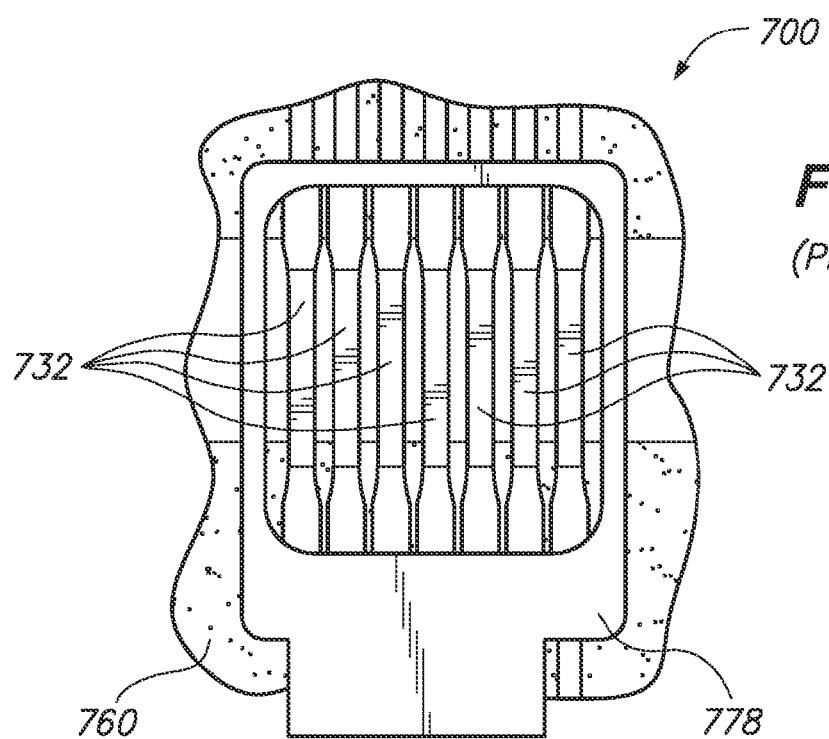
FIG. 7A depicts the interconnection between a prior art flexure tail and FPC, after assembly.
Figure 7B:
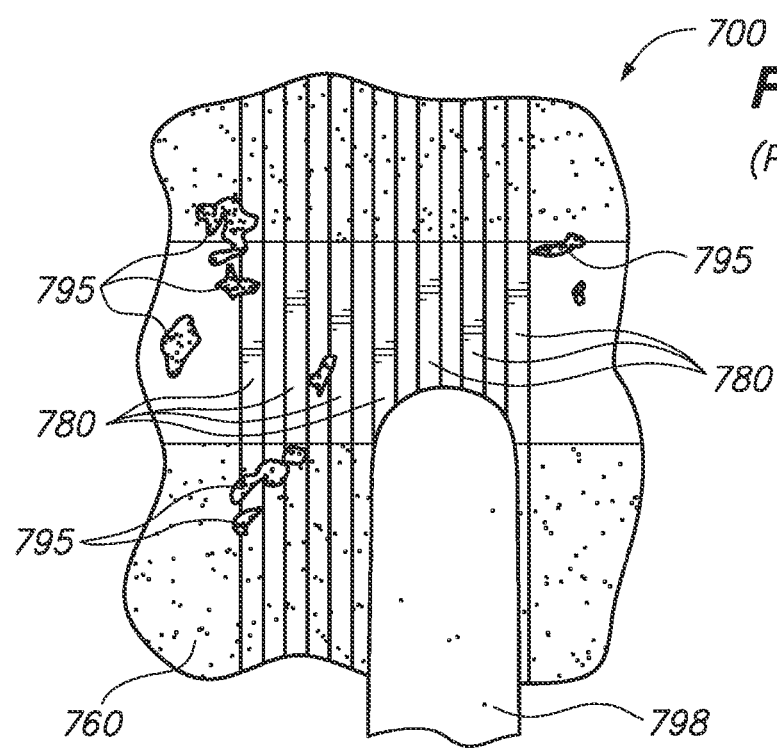
FIG. 7B depicts an intermediate stage of rework of the interconnection of FIG. 7A, according to the prior art.

FIG. 7A depicts a portion of a HSA 700, showing the interconnection between a prior art flexure tail terminal region 778 and a FPC 760, after assembly. FIG. 7B depicts an intermediate stage of rework of the interconnection of FIG. 7A, according to the prior art. Now referring to FIGS. 7A-B, the flexure tail terminal region 778 includes a bonding region that has a plurality of flexure flying-lead bond pads 732. Each of the plurality of flexure flying-lead bond pads 732 is bonded (using an electrically conductive bonding material 795) to a corresponding one of a plurality of FPC bond pads 780.

According to the prior art rework process depicted in FIG. 7B, the entire flexure tail terminal region 778 is removed from the FPC 760 by destroying the bonds there between, before a replacement flexure tail is bonded in its place. Such prior art rework method makes a contaminant out of the old bonding material 795, and therefore requires a time-consuming cleaning step. For example, the prior art rework method requires a time consuming step of using a pick 798 (or other small tool) to sufficiently clean away old bonding material 795 remaining from the prior destroyed bond, to enable a new robust and reliably conductive bond to be made later to the replacement flexure tail. Such time consuming cleaning step may be advantageously avoided according to certain embodiments of the rework method disclosed herein.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A method for head stack assembly (HSA) rework, comprising:
   removing a first head gimbal assembly (HGA) from the HSA, the first HGA including a first suspension that is attached to an arm of the HSA, the first HGA also including a first flexure tail that terminates in a first bonding region that is bonded to a flexible printed circuit (FPC) of the HSA, wherein removing the first HGA includes:
      cutting the first flexure tail to separate the first bonding region from a remainder of the first flexure tail, including leaving the first bonding region bonded to the FPC, and
      detaching the first suspension from the arm; and
   installing a replacement HGA on the HSA, the replacement HGA including a replacement suspension and a replacement flexure tail that terminates in a second bonding region, wherein installing the replacement HGA includes:
      attaching the replacement suspension to the arm,
      overlaying the second bonding region on top of the first bonding region, and
      bonding the second bonding region to the first bonding region.

2. The method of claim 1 wherein bonding the second bonding region to the first bonding region establishes a plurality of electrical connections from the second bonding region to the FPC, through the first bonding region.

3. The method of claim 1 wherein overlaying the second bonding region on top of the first bonding region includes aligning a plurality of patterned features of a conductive layer of the second bonding region to a corresponding plurality of patterned features of a conductive layer of the first bonding region.

4. The method of claim 1 wherein bonding the second bonding region to the first bonding region comprises bonding a plurality of patterned features of a copper layer of the second bonding region to a corresponding plurality of patterned features of a stainless steel layer of the first bonding region.

5. The method of claim 4 wherein each of the corresponding plurality of patterned features of the stainless steel layer of the first bonding region is coated with gold.

6. The method of claim 1 wherein bonding the second bonding region to the first bonding region comprises using a thermode tool to apply pressure to an anisotropic conductive film that includes a plurality of electrically conductive beads.

7. The method of claim 6 wherein bonding the second bonding region to the first bonding region comprises bonding a plurality of patterned features of the second bonding region to a corresponding plurality of patterned features of the first bonding region, and using a flat face of the thermode tool to apply pressure to all of the plurality of patterned features simultaneously.

8. The method of claim 1 wherein attaching the replacement suspension to the arm comprises swaging the replacement suspension to the arm, and wherein detaching the first suspension from the arm comprises de-swaging the first suspension from the arm.

9. A method to manufacture a head stack assembly, the method comprising:
   providing an actuator including an arm and a flexible printed circuit (FPC) including a plurality of FPC bond pads;
   providing a first head gimbal assembly (HGA) that includes a first suspension, a first read head, and a first flexure tail including a first bonding region, the first bonding region including a first plurality of flexure tail conductive bond pads;
   attaching the first suspension to the arm;
   bonding each of the first plurality of flexure tail conductive bond pads to a corresponding one of the plurality of FPC bond pads;
   testing the HSA;
   cutting the first flexure tail to separate the first bonding region from a remainder of the first flexure tail, including leaving the first plurality of flexure tail conductive bond pads bonded to the corresponding plurality of FPC bond pads;
   detaching the first suspension from the arm;
   installing a replacement HGA on the HSA, the replacement HGA including a replacement suspension and a replacement flexure tail that terminates in a second bonding region, the second bonding region including a second plurality of flexure tail conductive bond pads, wherein installing the replacement HGA includes:
      attaching the replacement suspension to the arm,
      overlaying the second bonding region on top of the first bonding region, and
      bonding each of the second plurality of flexure tail conductive bond pads to a corresponding one of the first plurality of flexure tail conductive bond pads.

10. The method of claim 9 wherein overlaying the second bonding region on top of the first bonding region includes aligning the second plurality of flexure tail conductive bond pads with the first plurality of flexure tail conductive bond pads.

11. The method of claim 9 wherein bonding each of the second plurality of flexure tail conductive bond pads to a corresponding one of the first plurality of flexure tail conductive bond pads comprises:
   introducing an adhesive material that includes a plurality of electrically conductive beads between the second plurality of flexure tail conductive bond pads and the first plurality of flexure tail conductive bond pads, and
   bringing a thermode tool into contact with the second bonding region, with the thermode tool pressing the second plurality of flexure tail conductive bond pads against the first plurality of flexure conductive bond pads for a period.

12. The method of claim 11 wherein bringing the thermode tool into contact with the second bonding region comprises using a flat face of the thermode tool to apply pressure to a large enough area of the second bonding region that all of the second plurality of flexure tail conductive bond pads are bonded to corresponding ones of the first plurality of flexure tail conductive bond pads simultaneously.

13. The method of claim 11 wherein the thermode tool transfers heat through the second bonding region and raises the temperature of the adhesive material during the period.

14. The method of claim 9 wherein attaching the replacement suspension to the arm comprises swaging the replacement suspension to the arm.

15. The method of claim 9 wherein bonding each of the second plurality of flexure tail conductive bond pads to a corresponding one of the first plurality of flexure tail conductive bond pads establishes a plurality of electrical connections from the second bonding region to the FPC, through the first bonding region.

16. The method of claim 9 wherein each of the first plurality of flexure tail conductive bond pads includes a copper island facing the FPC and a stainless steel island facing the second bonding region of the replacement flexure tail, with the copper island being electrically connected to the stainless steel island by a via through a dielectric layer.

17. The method of claim 9 wherein each of the first plurality of flexure tail conductive bond pads includes a gold coating.

18. The method of claim 9 wherein each of the first plurality of flexure tail conductive bond pads is bonded to the corresponding one of the plurality of FPC bond pads by an anisotropic conductive film.

19. The method of claim 9 wherein detaching the first suspension from the arm comprises de-swaging the first suspension from the arm.

20. The method of claim 9 wherein testing the HSA includes testing the first read head.

* * * * *